United States Patent
Schober et al.

(10) Patent No.: US 11,452,105 B2
(45) Date of Patent: Sep. 20, 2022

(54) HARQ-ACK CODEBOOK SUPPORTING UES WITH PARALLEL PDSCH RECEPTION CAPABILITY

(71) Applicant: Nokia Technologies OY, Espoo (FI)

(72) Inventors: Karol Schober, Helsinki (FI); Kari Juhani Hooli, Oulu (FI)

(73) Assignee: Nokia Technologies OY, Espoo (FI)

( * ) Notice: Subject to any disclaimer, the term of this patent is extended or adjusted under 35 U.S.C. 154(b) by 35 days.

(21) Appl. No.: 17/044,624

(22) PCT Filed: Apr. 6, 2018

(86) PCT No.: PCT/EP2018/058810
§ 371 (c)(1),
(2) Date: Oct. 1, 2020

(87) PCT Pub. No.: WO2019/192715
PCT Pub. Date: Oct. 10, 2019

(65) Prior Publication Data
US 2021/0153185 A1    May 20, 2021

(51) Int. Cl.
*H04W 72/04*  (2009.01)
*H04L 1/16*  (2006.01)
(Continued)

(52) U.S. Cl.
CPC ......... *H04W 72/048* (2013.01); *H04L 1/1621* (2013.01); *H04L 5/0051* (2013.01); *H04W 72/1273* (2013.01)

(58) Field of Classification Search
CPC ......... H04W 72/1273; H04W 72/1268; H04W 72/1263; H04W 72/048; H04W 72/0486;
(Continued)

(56) References Cited

U.S. PATENT DOCUMENTS

| | | | |
|---|---|---|---|
| 2017/0134236 A1* | 5/2017 | Patel | H04W 74/004 |
| 2019/0215124 A1* | 7/2019 | Bendlin | H04L 5/0044 |

(Continued)

FOREIGN PATENT DOCUMENTS

| | | | | |
|---|---|---|---|---|
| WO | WO-2019142330 A1 * | 7/2019 | | H04W 72/042 |
| WO | WO-2019193700 A1 * | 10/2019 | | H04L 1/1896 |

OTHER PUBLICATIONS

International Search Report PCT/ISA/327 for International Application PCT/EP2018/058810, dated Nov. 27, 2018.
(Continued)

*Primary Examiner* — Phong La
(74) *Attorney, Agent, or Firm* — Harness, Dickey & Pierce, P.L.C.

(57) ABSTRACT

It is provided a method, including checking if an overlapping transmission is restricted to an overlapping transmission of a transmission of a first type and a transmission of a second type; splitting, if the overlapping transmission is restricted, an overall symbol allocation table into a first type symbol allocation table including the symbol allocations related to the transmission of the first type and into a second type symbol allocation table including the symbol allocations related to the transmission of the second type; separately pruning the first type symbol allocation table and the second type symbol allocation table in order to obtain one or more second type occasions for the transmission of the respective type; monitoring, for each of a first resource and a second resource different from the first resource and for each of the first type occasions and for each of the second type occasions, if a respective transmission is successfully received; acknowledging in a codebook the respective transmission if the respective transmission is successfully received.

21 Claims, 5 Drawing Sheets

(51) Int. Cl.
*H04L 5/00* (2006.01)
*H04W 72/12* (2009.01)

(58) Field of Classification Search
CPC .......... H04W 72/0493; H04W 72/044; H04W 72/0406; H04W 72/04; H04W 72/06; H04W 72/08; H04L 5/0051; H04L 5/0048; H04L 5/005; H04L 1/1621; H04L 1/1628; H04L 1/1635; H04L 1/1642; H04L 1/1664; H04L 1/1671; H04L 1/1685; H04L 1/1607
See application file for complete search history.

(56) References Cited

U.S. PATENT DOCUMENTS

2019/0246395 A1*  8/2019  Huang .............. H04W 72/0446
2021/0006377 A1*  1/2021  Hooli .................. H04L 5/0055

OTHER PUBLICATIONS

Office Action for Indian Application No. 202047045506 dated Dec. 14, 2021.
Nokia, Nokia Shanghai Bell: "Remaining aspects of NR CA"; Tdoc: R1-1800745; 3GPP TSG RAN WG1 Meeting AH 1801 Vancouver, Canada, Jan. 22-26, 2018.
Nokia, Nokia Shanghai Bell: "Remaining aspects of NR CA"; Tdoc: R1-1802540; 3GPP TSG RAN WG1 Meeting #92 Athens, Greece, Feb. 26-Mar. 2, 2018.

* cited by examiner

HARQ-ACK CODEBOOK SUPPORTING UES WITH PARALLEL PDSCH RECEPTION CAPABILITY

This application is a national phase under 35 U.S.C. § 371 of PCT International Application No. PCT/EP2018/058810 which has an International filing date of Apr. 6, 2018, the entire contents of each of which are hereby incorporated by reference.

FIELD OF THE INVENTION

The present invention relates to an apparatus, a method, and a computer program product related to parallel PDCSH reception capability.

Abbreviations

3GPP 3$^{rd}$ Generation Partnership Project
ACK acknowledgement
BWP Bandwidth part
CB codebook
CBG code block group
CoMP Coordinated Multipoint
CORESET control resource set
C-DAI counter DL assignment indicator
DAI DL assignment indicator
DCI DL control information
DL downlink
DMRS demodulation reference signal
gNB NR base station
HARQ hybrid automatic repeat request
ID identifier
IoT Internet of Things
MIB Management information base
NACK non-acknowledgement
NR new radio
PDCCH physical downlink control channel
PDSCH physical downlink shared channel
PUCCH physical uplink control channel
QCL quasi co-location
OFDM Orthogonal Frequency Division Multiplex
RAN Radio Access Network
RRC radio resource control
SLIV start-length indicator value
SPS Semi-persistent Scheduling
TB transport block
TRP transmission point
TS technical specification
UE user equipment
UL uplink

BACKGROUND OF THE INVENTION

The present application relates to 3GPP New Radio design, and in particular to the design of a semi-static HARQ-ACK codebook (TYPE-1) that UE reports to gNB in UL in NR R15 as in 3GPP TS38.213, or an enhancement thereof in NR R16.

The frame structure of NR is defined in 3GPP TS38.211 Section 4.3.2. as

For subcarrier spacing configuration [of numerology]$^\mu$, slots are numbered $n_s^\mu \in \{0, \ldots, N_{slot}^{subframe,\mu}-1\}$ in increasing order within a subframe and $n_{s,f}^\mu \in \{0, \ldots, N_{slot}^{frame,\mu}-1\}$ in increasing order within a frame. There are $N_{symb}^{slot}$ consecutive OFDM symbols in a slot where $N_{symb}^{slot}$ depends on the cyclic prefix as given by Tables 4.3.2-1 and 4.3.2-2. The start of slot $n_s^\mu$ in a subframe is aligned in time with the start of OFDM symbol $n_s^\mu N_{symb}^{slot}$ in the same subframe.

TABLE 4.3.2-1

Number of OFDM symbols per slot, slots per frame, and slots per subframe for normal cyclic prefix.

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4.3.2-2

Number of OFDM symbols per slot, slots per frame, and slots per subframe for extended cyclic prefix.

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

Furthermore, there are a RAN1 agreement and a working assumption:

Agreements:
  For semi-static HARQ-ACK codebook, support
    DL association set is determined based on the configured set of HARQ-ACK timings, where the HARQ-ACK payload is ordered based on DL time index;
    There is no DAI in DL grants
Working assumption:
  When a UE is configured with semi-static HARQ-ACK Codebook, on a per cell basis:
    If the UE indicates capability to receive more than one unicast PDSCH per slot, it assumes a max number of non-overlapping candidate unicast PDSCH occasions per slot as determined by the SLIV in the configured pdsch-symbol Allocation table.
    Otherwise, the UE is expected to receive only one unicast PDSCH per slot, and HARQ-ACK association set assumes one unicast PDSCH per slot;
    Handling HARQ-ACK for PDCCH for SPS release follows the same way as in LTE NR semi-static HARQ-ACK codebook contains one HARQ-ACK container of the size of 1 bit (if 1 TB is transmitted per PDSCH), 2 bits (if 2 TBs are transmitted per PDSCH) or N bits (in case of CBG based feedback) per each "occasion for candidate PDSCH reception". The determination of these occasions depends on the following:
  RRC configured K1 times (time offset from the end of PDSCH to the HARQ-ACK transmission in units of a slot)
  SLIV (time-domain allocation within a slot) values in RRC configured pdsch-symbolAllocation table
  DL/UL semi-static RRC configuration
  number of RRC configured HARQ-ACK processes in a cell (under discussion)

Identification of Candidate PDSCH Slots Based on K1 Values

Figure 1:
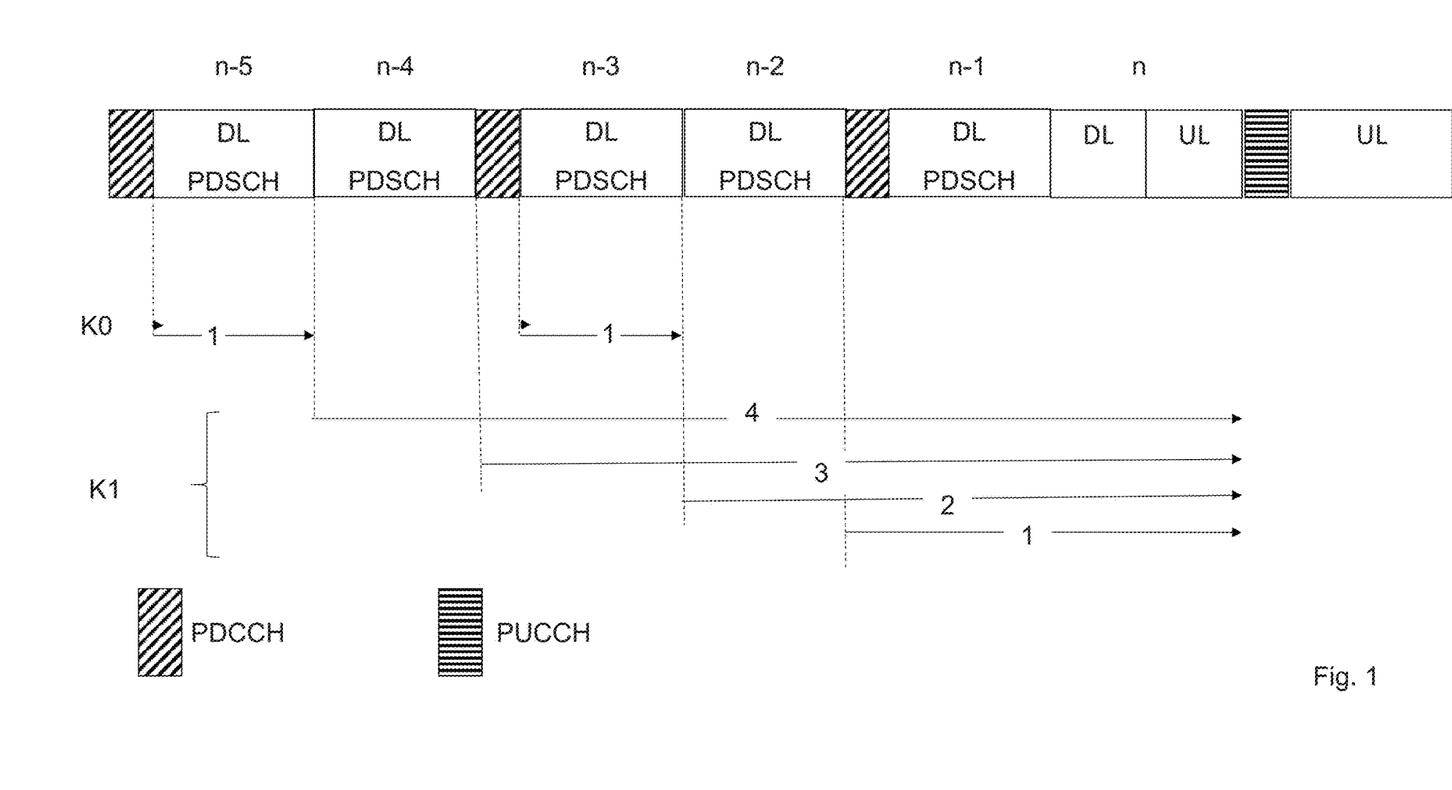
FIG. 1 shows a PDSCH candidate occasion determination.

A UE and a gNB determine the slot occasions for candidate PDSCH reception M for PDSCHs to be ACKed in slot n as those PDSCH occasions that could have been scheduled to report HARQ feedback in slot n based on configured K1 values. In an example in FIG. 1 for TDD, 30 kHz, and a periodicity of 5 slots, gNB configures UE with four values of K1={1,2,3,4}. Therefore, there are four slot occasions for candidate PDSCH reception. If single TB transmission is configured without CBG, then the HARQ-ACK codebook size would be 4 bits. Different patterns denote PDCCH, PDSCH, and PUCCH, wherein HARQ-ACK codebook is transmitted on PUCCH. K0 indicates a time offset from the end of scheduling PDCCH to the start of PDSCH in units of a slot. In the example of FIG. 1, K0=0 or 1.

SLIV Pruning within a Slot

In addition, within each slot a UE can be scheduled with one or more non-overlapping PDSCH transmissions (e.g. mini-slots). Therefore, given configured SLIV values (which are jointly coded PDSCH start symbol and PDSCH length values) in pdsch-symbolAllocation (an example of pdsch-symbolAllocation is shown in Table 1 for normal cyclic prefix, wherein each slot comprises 14 symbols #0 to #13), both UE and gNB may determine how many potentially non-overlapping PDSCH can be transmitted within each slot. The identification of non-overlapping transmissions within a slot is also referred to as "SLIV pruning". For overlapping SLIVs, there is only a single container reserved in the HARQ-ACK codebook.

The pdsch-symbolAllocation table may contain, in addition to SLIV, also other values, such as K0 (see above) and DMRS demodulation type A (DMRS in fixed symbol of a slot, i.e. symbol 2 or 3 based on MIB indication) or type B (DMRS in first symbol of PDSCH transmission). These values are currently not used for semi-static HARQ-ACK codebook determination. The TYPE A may be typically used for slot-based scheduling while TYPE B for mini-slot scheduling (also denoted as non-slot based scheduling). Note that the remaining bits of slot-based scheduling (i.e. r={0, 1, 2, 3} in the example may be used for control purposes. Different PDSCH starting symbol positions and durations allow time division multiplexing of PDCCH and/or PUCCH on the same slot as PDSCH. Starting symbols 2 and 3 support time division multiplexing with 2 or 3 symbol PDCCH, and 10 symbol duration with starting symbol 2 allows to multiplex 1 symbol PUCCH at the end of slot.

TABLE 1

An example of a configured pdsch-symbolAllocation table

| | | SLIV | | |
|---|---|---|---|---|
| r | $K_0$ | S | L | DMRS type |
| 0 | 0 | 2 | 12 | A |
| 1 | 0 | 3 | 11 | A |
| 2 | 0 | 2 | 10 | A |
| 3 | 0 | 3 | 9 | A |
| 4 | 0 | 0 | 4 | B |
| 5 | 0 | 4 | 3 | B |
| 6 | 0 | 7 | 4 | B |
| 7 | 0 | 11 | 3 | B |
| 8 | 0 | 0 | 7 | B |
| 9 | 0 | 7 | 7 | B |

DL/UL Configuration Impact

In addition, if a candidate PDSCH as determined by SLIV value overlaps with UL symbol, the PDSCH transmission is forbidden and therefore, this candidate PDSCH corresponding to a SLIV value cannot be an occasion for candidate PDSCH reception.

SUMMARY OF THE INVENTION

It is an object of the present invention to improve the prior art.

According to a first aspect of the invention, there is provided an apparatus, comprising means for checking configured to check if an overlapping transmission is restricted to an overlapping transmission of a transmission of a first type and a transmission of a second type, wherein a value of a configuration parameter of the transmission of the first type is different from a value of the configuration parameter of the transmission of the second type; means for splitting configured to split, if the overlapping transmission is restricted, an overall symbol allocation table comprising symbol allocations into a first type symbol allocation table comprising one or more of the symbol allocations related to the transmission of the first type and into a second type symbol allocation table comprising one or more of the symbol allocations related to the transmission of the second type; means for pruning configured to prune the first type symbol allocation table in order to obtain one or more first type occasions for the transmission of the first type and to prune the second type symbol allocation table in order to obtain one or more second type occasions for the transmission of the second type, wherein the means for pruning is configured to prune the first type symbol allocation table separately from the second type symbol allocation table; means for monitoring configured to monitor, for each of a first resource and a second resource different from the first resource and for each of the first type occasions, and for each of the second type occasions if a respective transmission is successfully received; means for acknowledging configured to acknowledge, in a codebook comprising an ordered sequence of acknowledgment bits for each of the first resource and the second resource and for each of the first type occasions and for each of the second type occasions, the respective transmission if the respective transmission is successfully received.

The apparatus may further comprise means for supervising configured to supervise if an information on a capability to receive the overlapping transmission is provided, wherein the means for checking may be configured to decide that the overlapping transmission is restricted if the information on the capability is provided.

The apparatus may further comprise means for analyzing configured to analyze if a location of a first reference signal for at least one of the symbol allocations is different from a location of a second reference signal for another of the symbol allocations, wherein the overall symbol allocation table may comprise, for each of the symbol allocations, a respective indication of a location of a respective reference signal for demodulating a slot comprising the respective symbols, and the indication of the location is related to the slot; the means for checking may be configured to decide that the overlapping transmission is restricted if the location of the first reference signal is different from the location of the second reference signal.

The apparatus may further comprise means for listening configured to listen if a higher layer command restricting the overlapping transmission is received; wherein the means for checking may be configured to decide that the overlapping transmission is restricted if the higher layer command is received.

The configuration parameter may be a type of a demodulation reference signal.

The acknowledgment bits in the codebook may be ordered according to the respective resource, the respective type of occasion, and an index of the respective occasion for each of the types of occasion.

Each of the resources may be respective one or more control resource sets associated to a respective transmission point from which the respective transmission is received. If the resource associated to one of the transmission points is more than one control resource set each having a respective index, the acknowledgment bits may be ordered according to either the largest index or the smallest index of the indices of the more than one control resource sets.

The codebook may consist of a predefined number of one or more acknowledgement bits per each of the first and second resources and per each of the first type occasions and second type occasions.

According to a second aspect of the invention, there is provided an apparatus, comprising means for deciding configured to decide that an overlapping transmission to a terminal is restricted to an overlapping transmission of a transmission of a first type and a transmission of a second type, wherein a value of a configuration parameter of the transmission of the first type is different from a value of the configuration parameter of the transmission of the second type; means for splitting configured to split, if the overlapping transmission is restricted, an overall symbol allocation table comprising symbol allocations into a first type allocation table comprising one or more of the symbol allocations related to the transmission of the first type and into a second type symbol allocation table comprising one or more of the symbol allocations related to the transmission of the second type; means for pruning configured to prune the first type symbol allocation table in order to obtain one or more first type occasions for the transmission of the first type and to prune the second type symbol allocation table in order to obtain one or more second type occasions for the transmission of the second type, wherein the means for pruning is configured to prune the first type symbol allocation table separately from the second type symbol allocation table; means for instructing configured to instruct a first transmitter to schedule, on a first resource, a respective transmission of the first type on one or more of the first type occasions and a respective transmission of the second type on one or more of the second type occasions, and to instruct a second transmitter to schedule, on a second resource different from the first resource, a respective transmission of the first type on one or more of the first type occasions and a respective transmission of the second type on one or more of the second type occasions; means for observing configured to observe if a respective codebook is received, wherein the codebook comprises an ordered sequence of acknowledgment bits for each of the first resource and the second resource and for each of the first type occasions and for each of the second type occasions, and each of the acknowledgment bits indicates whether or not the respective transmission is successfully received.

The apparatus may further comprise means for monitoring configured to monitor if an indication of a capability of the terminal to receive the overlapping transmission is received, wherein the means for deciding may be configured to decide that the overlapping transmission is restricted if the indication of the capability of the terminal is received.

The apparatus may further comprise means for analyzing configured to analyze if a location of a first reference signal for at least one of the symbol allocations is different from a location of a second reference signal for another of the symbol allocations, wherein the overall symbol allocation table may comprise, for each of the symbol allocations, a respective indication of a location of a respective reference signal for demodulating a slot comprising the respective symbols, and the indication of the location is related to the slot; the means for deciding may be configured to decide that the overlapping transmission is restricted if the location of the first reference signal is different from the location of the second reference signal.

The apparatus may further comprise means for commanding configured to command by issuing a higher layer command that the overlapping transmission is restricted; wherein the means for deciding may be configured to decide that the overlapping transmission is restricted if the higher layer command is issued.

The configuration parameter may be a type of a demodulation reference signal.

The acknowledgment bits in the codebook may be ordered according to the respective resource, the respective type of occasion, and an index of the respective occasion for each of the types of occasion.

Each of the resources may be respective one or more control resource sets associated to a respective transmission point, and each of the transmitters is one of the transmission points. If the resource associated to one of the transmission points is more than one control resource set each having a respective index, the acknowledgment bits may be ordered according to either the largest index or the smallest index of the indices of the more than one control resource sets.

The codebook may consist of a predefined number of one or more acknowledgement bits per each of the first and second resources and per each of the first type occasions and second type occasions.

The apparatus may further comprise means for retransmission configured to retransmit one of the transmissions if the respective acknowledgment bit indicates that the respective transmission is not successfully received.

According to a third aspect of the invention, there is provided a method, comprising checking if an overlapping transmission is restricted to an overlapping transmission of a transmission of a first type and a transmission of a second type, wherein a value of a configuration parameter of the transmission of the first type is different from a value of the configuration parameter of the transmission of the second type; splitting, if the overlapping transmission is restricted, an overall symbol allocation table comprising symbol allocations into a first type symbol allocation table comprising one or more of the symbol allocations related to the transmission of the first type and into a second type symbol allocation table comprising one or more of the symbol allocations related to the transmission of the second type; pruning the first type symbol allocation table in order to obtain one or more first type occasions for the transmission of the first type and to prune the second type symbol allocation table in order to obtain one or more second type occasions for the transmission of the second type, wherein the means for pruning is configured to prune the first type symbol allocation table separately from the second type symbol allocation table; monitoring, for each of a first resource and a second resource different from the first resource and for each of the first type occasions, and for each of the second type occasions if a respective transmission is successfully received; acknowledging, in a codebook comprising an ordered sequence of acknowledgment bits for each of the first resource and the second resource and for each of the first type occasions and for each of the second type occasions, the respective transmission if the respective transmission is successfully received.

According to a fourth aspect of the invention, there is provided a method, comprising deciding that an overlapping transmission to a terminal is restricted to an overlapping transmission of a transmission of a first type and a transmission of a second type, wherein a value of a configuration parameter of the transmission of the first type is different from a value of the configuration parameter of the transmission of the second type; splitting, if the overlapping transmission is restricted, an overall symbol allocation table comprising symbol allocations into a first type allocation table comprising one or more of the symbol allocations related to the transmission of the first type and into a second type symbol allocation table comprising one or more of the symbol allocations related to the transmission of the second type; pruning the first type symbol allocation table in order to obtain one or more first type occasions for the transmission of the first type and to prune the second type symbol allocation table in order to obtain one or more second type occasions for the transmission of the second type, wherein the means for pruning is configured to prune the first type symbol allocation table separately from the second type symbol allocation table; instructing a first transmitter to schedule, on a first resource, a respective transmission of the first type on one or more of the first type occasions and a respective transmission of the second type on one or more of the second type occasions; instructing a second transmitter to schedule, on a second resource different from the first resource, a respective transmission of the first type on one or more of the first type occasions and a respective transmission of the second type on one or more of the second type occasions; observing if a respective codebook is received, wherein the codebook comprises an ordered sequence of acknowledgment bits for each of the first resource and the second resource and for each of the first type occasions and for each of the second type occasions, and each of the acknowledgment bits indicates whether or not the respective transmission is successfully received.

Each of the methods of the third and fourth aspects may be a method of HARQ acknowledgment.

According to a fifth aspect of the invention, there is provided a computer program product comprising a set of instructions which, when executed on an apparatus, is configured to cause the apparatus to carry out the method according to any of the third and fourth aspects. The computer program product may be embodied as a computer-readable medium or directly loadable into a computer.

According to some embodiments of the invention, at least one of the following advantages may be achieved:
support of (in time) HARQ-ACK reporting using TYPE-1 CB for overlapping PDCSH transmissions;
with reduced size of HARQ-ACK codebook;
with reduced signaling effort and computational effort.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein.

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

Current CB design, as described above, cannot support parallel (that is, fully or partly overlapping in time) PDSCH transmissions, because parallel transmissions are removed from occasions for candidate PDSCH reception in "SLIV pruning" stage. Some embodiments of the invention provide a solution on how to extend current semi-static CB design to support HARQ-ACK feedback also for parallel PDSCH transmissions.

The need for parallel processing of multiple PDSCH at the same time by UE is required at least for the following cases:
Multi-TRP (NR CoMP), where, each TRP (transmission point) schedules one PDSCH in the same slot (but on different frequencies; and
Mini-slot and slot PDSCH are served in parallel on different frequencies by a gNB, e.g. for different traffic types.

The straightforward solution would be just to copy the HARQ-ACK codebook for each possible parallel PDSCH transmission. This would double or triple the overall size of a codebook for UEs supporting 2 parallel or 3 parallel PDSCH transmissions. Apart from the large overall size, there would be a further issue. Namely, within the codebook, the ACK/NACK bits for the detected & overlapping PDSCHs need to be ordered/mapped to the right positions on the overlapping occasions for candidate PDSCH reception. The ordering/mapping could be based e.g. on DAI in scheduling DL assignment. However, it was agreed that there is no DAI in the scheduling DL assignment in non-fall-back DCI formats when semi-static CB is configured (see above).

According to some embodiments of the invention, a semi-static HARQ-ACK codebook is determined such that it supports reception of multiple PDSCHs overlapping in time. In an embodiment, the codebook is determined such that SLIV pruning is performed only among PDSCHs candidate occasion sets associated with the same DMRS type, and ordering of HARQ-ACK bits for PDSCHs transmitted from different TRPs is based on an ID associated to the PDCCH carrying the DL assignment (for example CORESET ID).

This codebook determination corresponds to restricting the overlapping transmissions to those of different types of DMRS. I.e., a slot based transmission (DMRS type A) may overlap, even partially, with a mini-slot based transmission but not with another slot-based transmission on the same time-domain resource. A mini-slot based transmission (DMRS type B) may overlap, even partially, with a slot based transmission but not with another mini-slot-based transmission on the same time-domain resource.

For the two examples outlined above where overlapping transmission and reception may be needed, a respective embodiment is described in more detail below:

Overlapping transmission by gNB:
if UE reports capability for parallel reception of mini-slot and slot, [and gNB configures such operation (note that gNB is allowed to transmit in parallel (fully or partly overlapping in time) even without such indication from the UE; in this case, UE not being capable of parallel reception will discard the later received DL assignment)], then
rows in pdsch-symbolAllocation table are grouped into two sets of rows based on indicated DMRS type (TYPE A or TYPE B), to obtain a "slot symbol allocation table" and a "mini-slot symbol allocation table".
SLIV pruning is performed separately for each set of pdsch-symbolAllocation table rows (i.e. separately for "slot symbol allocation table" and a "mini-slot symbol allocation table") resulting in PDSCH candidate occasion sets $M_A$ and $M_B$. These are concatenated in the final codebook.
(Otherwise, prior art SLIV pruning is performed over all rows (independently of DMRS type) in pdsch-symbolAllocation table resulting in PDSCH candidate occasion set M described above)

Overlapping transmission by plural TRPs:
If UE reports capability to support simultaneous reception from multiple TRPs, [and gNB configures N TRPs to a UE], then semi-static CB reserves N HARQ-ACK containers per each PDSCH occasion determined
in $M_A$ and $M_B$ if parallel transmission of mini-slot and slot is reported as capability [and configured by gNB], otherwise
in M if parallel transmission of mini-slots and slots is NOT reported as capability by a UE or [NOT configured by gNB]
UE monitors for scheduled transmissions in each PDSCH occasion in multiple groups of one or more CORESET(s) where the group of one or more CORESET(s) is formed by CORESET(s) associated with a single TRP (e.g. by QCL), and
UE maps HARQ feedback for PDSCH scheduled in the PDSCH occasion to the N containers based on the identifier of a CORESET in the CORESET group where PDSCH was scheduled
where the identifier of a CORESET in the CORESET group where PDSCH was scheduled is the lowest (or highest, depending on implementation) identifier among CORESETs in the group Here, only one PDSCH of the same DMRS type (TYPE A/B) can be received simultaneously from each TRP, and hence only single HARQ-ACK container per DMRS type is reserved for CORESETs associated with the same TRP. Based on above operation, there will be a common understanding between UE and gNB on bit order in the semi-static codebook.

Hereinafter, there are provided two examples of HARQ-ACK codebook determination given the above embodiments. The RRC configurations are those of Table 1, K1={1, 2,3,4} and two CORESETs are configured to a UE on a BWP. CORESET #0 is associated with one TRP and CORESET #1 is associated with another TRP. In addition, a UE is configured with overlapping reception of slot and mini-slot. For simplicity, in the below example, single TB transmissions per slot are configured to the UE; otherwise, the number of bits has to be multiplied by the number of TBs per slot.

In the first step, gNB/UE separates the configured Table 1 into two tables ("slot based symbol allocation table", DMRS type A, shown in Table 2) and ("mini-slot based symbol allocation table", DMRS type B, shown in Table 3):

TABLE 2 slot based symbol allocation table

| | | SLIV | | |
|---|---|---|---|---|
| r | $K_0$ | S | L | DMRS type |
| 0 | 0 | 2 | 12 | A |
| 1 | 0 | 3 | 11 | A |
| 2 | 0 | 2 | 10 | A |
| 3 | 0 | 3 | 9 | A |

TABLE 3 mini-slot based symbol allocation table

| | | SLIV | | |
|---|---|---|---|---|
| r | $K_0$ | S | L | DMRS type |
| 4 | 0 | 0 | 4 | B |
| 5 | 0 | 4 | 3 | B |
| 6 | 0 | 7 | 4 | B |
| 7 | 0 | 11 | 3 | B |
| 8 | 0 | 0 | 7 | B |
| 9 | 0 | 7 | 7 | B |

In the second step, UE/gNB performs SLIV pruning for slot based symbol allocation table and mini-slot based symbol allocation table separately. As a consequence, gNB identifies the candidate PDSCH occasion sets $M_A$ and $M_B$ shown in Table 4:

TABLE 4 combined occasion sets

| Set $M_A$ | Index r of SLIV |
|---|---|
| PDSCH occasion j = 1 | 0, 1, 2, 3 |

| Set $M_B$ | Index r of SLIV |
|---|---|
| PDSCH occasion j = 2 | 4, 8 |
| PDSCH occasion j = 3 | 5 |
| PDSCH occasion j = 4 | 6, 9 |
| PDSCH occasion j = 5 | 7 |

The occasion tables of Table 4 have to be read as follows: In each table, the PDSCH occasion symbol allocations are selected in the sequence of increasing value of j. From each occasion j, none or exactly one symbol allocation (SLIV index) of row r is selected for transmission by gNB. The rows are mapped to the PDSCH occasions j according the following algorithm in TS38.213:
(1) Set j=0, determine the row r with the lowest value of S(r) out of the rows configured in Table 2 or Table 3, set $S_j$=S(r) and $L_j$=L(r).
(2) map all the rows r with starting symbol S(r), for which $S_j \leq S(r) \leq (S_j + L_j)$, to the same PDSCH occasion index j.
(3) remove the already allocated rows from Table 2 or Table 3, increase j=j+1 and return to step (1).

Furthermore, gNB may select symbol allocation with r=4 of PDSCH occasion j=2 and symbol allocation with r=5 of PDSCH occasion j=3 because SLIV index r=5 and index r=4 do not overlap. On the other hand, gNB must not select symbol allocation with r=8 of PDSCH occasion j=2 and symbol allocation with r=5 of PDSCH occasion j=3, because SLIV allocations of these two rows are overlapping. The fact that r=5 and r=8 are in different j does not allow the gNB to transmit overlapping PDSCH allocations.

Embodiments of the invention are not restricted to the above representation of allocation tables and reading rules, but other representations and related reading rules may apply, if it is ensured that symbol allocations of the same type do not overlap.

In the third step, for each slot determined by K1 value, a UE will feedback 1 bit per each TRP per each of 5 PDSCH occasions identified above, i.e. total feedback per slot will be 10 bits. The overall codebook size is 40 bits for four distinct K1 values. In the final step, UE will transmit the determined HARQ-ACK codebook, and gNB will receive the determined HARQ-ACK codebook. Then, they will proceed as usual according to the HARQ process depending on whether ACK or NACK in indicated in the HARQ-ACK codebook for the respective transmission.

For example, if gNB transmits SLIVs r={1, 4, 9} from one TRP associated with CORESET #0 and r={5, 9} from the other TRP associated with CORESET #1 in the same slot, and all PDSCH transmissions are successfully received (i.e. could be decoded), the reported HARQ-ACK bits for that slot will be {A N|A N|N A|A A|N N}, as explained in Table 5.

That is, the HARQ bits are arranged in pairs for the two TRPs (in n-tupels for n TRPs), and the pairs (n-tupels) are arranged according to the DMRS type (slot based or mini-slot based), and for each DMRS type in the sequence of the occasion indices.

Example 2 explains a case when one or more TRPs are configured with plural CORESETs. There may be more than two CORESETs configured to a UE, and CORESETS may be associated with more than two TRPs. In addition, more than one CORESET may be associated with the same TRP.

Example 2 follows the example 1, e.g., the RRC configurations are those of Table 1, K1={1,2,3,4}, a UE is configured with overlapping reception of slot based transmission (DMRS type A) and mini-slot based transmission (DMRS type B), and overlapping reception of slot based transmissions and overlapping reception of mini-slot based transmissions are forbidden. Three CORESETs are configured to a UE on a BWP. CORESETs with identifiers #0 and #2 are associated with TRP #1 and CORESET with identifier #1 is associated with another TRP (TRP #2).

In the example, gNB transmits PDSCHs with SLIVs r={1, 4} from one TRP associated with CORESET #0, PDSCH with SLIV r={9} from one TRP associated with CORESET #2 and PDSCHs with r={5, 9} from the other TRP associated with CORESET #1 in the same slot, and all PDSCH transmissions are successfully received (i.e. could be decoded). The reported HARQ-ACK bits for that slot will be {A N|A N|N A|A A|N N}, as explained in Table 6.

TABLE 5 explanation of HARQ bits in the example 1

| Set $M_A$ | SLIV index r | TRP #1 | TRP #2 |
|---|---|---|---|
| PDSCH occasion j = 1 | 0, 1, 2, 3 | Ack for SLIV = 1 (CB position #1) | No PDSCH -> NACK (CB position #2) |
| Set $M_B$ | SLIV index r | | |
| PDSCH occasion j = 2 | 4, 8 | Ack for SLIV = 4 (CB position #3) | No PDSCH -> NACK (CB position #4) |
| PDSCH occasion j = 3 | 5 | No PDSCH -> NACK (CB position #5) | Ack for SLIV = 5 (CB position #6) |
| PDSCH occasion j = 4 | 6, 9 | Ack for SLIV = 9 (CB position #7) | Ack for SLIV = 9 CB position #8) |
| PDSCH occasion j = 5 | 7 | No PDSCH -> NACK (CB position #9) | No PDSCH -> NACK (CB position #10) |

TABLE 6 explanation of HARQ bits in the example 2

| Set MA | SLIV index r | TRP #1 | TRP #2 |
|---|---|---|---|
| PDSCH occasion j = 1 | 0, 1, 2, 3 | Ack for SLIV = 1, CORESET #0 (CB position #1) | No PDSCH -> NACK (CB position #2) |
| Set MB | SLIV index r | | |
| PDSCH occasion j = 2 | 4, 8 | Ack for SLIV = 4, CORESET #0 (CB position #3) | No PDSCH -> NACK (CB position #4) |
| PDSCH occasion j = 3 | 5 | No PDSCH -> NACK (CB position #5) | Ack for SLIV = 5, CORESET #1 (CB position #6) |
| PDSCH occasion j = 4 | 6, 9 | Ack for SLIV = 9, CORESET #2 (CB position #7) | Ack for SLIV = 9, CORESET #1 CB position #8) |
| PDSCH occasion j = 5 | 7 | No PDSCH -> NACK (CB position #9) | No PDSCH -> NACK (CB position #10) |

That is, the HARQ bits are arranged in pairs for the two TRPs (in n-tupels for n TRPs), and the pairs (n-tupels) are arranged according to the DMRS type (slot based or mini-slot based), and for each DMRS type in the sequence of the occasion indices. When arranging the HARQ bits in pairs for the two TRPs, the order is determined based on the increasing (or decreasing) order of CORESET identifier associated to the TRP. As the CORESET #0 is associated with TRP #1 and CORESET #0 is associated with TRP #2, HARQ bit for TRP #1 is arranged before corresponding HARQ bit for TRP #2. In this example, two CORESETS (#0 and #2) are associated with TRP #1. The ordering is determined based on the increasing (or decreasing) order of smallest (or largest) CORESET identifier associated to the TRP. In this example, CORESET identifier #0 is the smallest associated to TRP #1 and, hence, is used in the HARQ bit ordering for the TRPs #1 and #2. Hence, HARQ bit for TRP #1 is arranged before corresponding HARQ bit for TRP #2 even for PDSCH with SLIV r={9} from one TRP associated with CORESET #2.

In comparison, if SLIV pruning is directly based on Table 1 (without separating according to DMRS types), UE/gNB would identify the following candidate PDSCH occasion sets M for non-overlapping PDSCHs. This set would be copied for all possible PDSCHs overlapping in time, both for slots/mini-slots and transmissions from different TRPs. For each slot determined by K1 value, a UE would feedback 1 bit per each TRP per each of 4 PDSCH occasions identified below for both slots and mini-slots, i.e. total feedback will be 16 bits. The overall codebook size would be 64 for four distinct K1 values.

TABLE 7 occasions according to the prior art

| Set M | SLIV index r |
|---|---|
| PDSCH occasion j = 1 | 4, 8, 0, 1, 2, 3 |
| PDSCH occasion j = 2 | 5 |
| PDSCH occasion j = 3 | 6, 9 |
| PDSCH occasion j = 4 | 7 |

Depending on implementation, there are plural options how gNB may decide if overlapping transmissions of the same DMRS type are forbidden and overlapping transmissions of different DMRS types are allowed. That is, the restriction to overlapping transmissions and the corresponding CB design (as explained above) may apply if one or more of the following conditions applies:

If UE reports on its capability to receive overlapping transmissions, gNB may consider this as a trigger to allow overlapping transmissions of different DMRS types and forbid overlapping transmissions of the same DMRS type. UE knows about its reported capability (and the consequence at gNB side) anyway.

if gNB configures different DMRS types in pdsch-symbolAllocation, UE may understand this as an implicit trigger to allow overlapping transmissions of different DMRS types and forbid overlapping transmissions of the same DMRS type.

gNB may inform UE that the above CB design is applicable by higher layer signaling.

Figure 2:
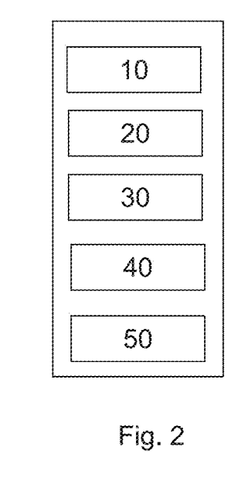
FIG. 2 shows an apparatus according to an embodiment of the invention.
Figure 3:
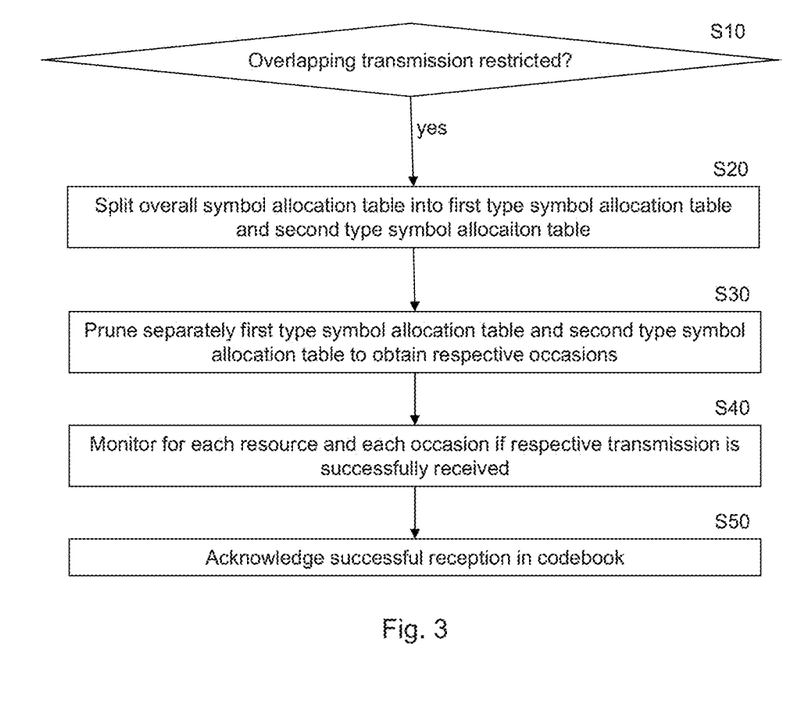
FIG. 3 shows a method according to an embodiment of the invention.

FIG. 2 shows an apparatus according to an embodiment of the invention. The apparatus may be a terminal such as a UE or an IoT device, or an element thereof. FIG. 3 shows a method according to an embodiment of the invention. The apparatus according to FIG. 2 may perform the method of FIG. 3 but is not limited to this method. The method of FIG. 3 may be performed by the apparatus of FIG. 2 but is not limited to being performed by this apparatus.

The apparatus comprises means for checking 10, means for splitting 20, means for pruning 30, means for monitoring 40, and means for acknowledging 50. The means for checking 10, means for splitting 20, means for pruning 30, means for monitoring 40, and means for acknowledging 50 may be a checking means, splitting means, pruning means, monitoring means, and acknowledging means, respectively. The means for checking 10, means for splitting 20, means for pruning 30, means for monitoring 40, and means for acknowledging 50 may be a checker, splitter, pruner, monitor, and acknowledger, respectively. The means for checking 10, means for splitting 20, means for pruning 30, means for monitoring 40, and means for acknowledging 50 may be a checking processor, splitting processor, pruning processor, monitoring processor, and acknowledging processor, respectively.

The means for checking 10 checks if an overlapping transmission is restricted to an overlapping transmission of a transmission of a first type and a transmission of a second type (S10). That is, overlapping transmissions of two transmissions the first type or overlapping transmissions of two transmissions of the second type are forbidden on the same resource. A value of a configuration parameter of the transmission of the first type is different from a value of the configuration parameter of the transmission of the second type. For example, the configuration parameter may be a DMRS type. If the overlapping transmission is restricted by default (e.g. by a 3GPP standard), the checking means 10 and the corresponding checking S10 may be omitted.

If the overlapping transmission is restricted (S10="yes"), the means for splitting 20 splits an overall symbol allocation table into a first type symbol allocation table and into a second type symbol allocation table (S20). The overall symbol allocation table comprises symbol allocations. The first type symbol allocation table comprises one or more (e.g. all) of the symbol allocations related to the transmission of the first type. The second type symbol allocation table comprises one or more (e.g. all) of the symbol allocations related to the transmission of the second type.

The means for pruning 30 prunes the first type symbol allocation table in order to obtain one or more first type occasions for the transmission of the first type and to prune the second type symbol allocation table in order to obtain one or more second type occasions for the transmission of the second type (S30). The means for pruning 30 prunes the first type symbol allocation table separately from the second type symbol allocation table. "Pruning" means assigning the symbol allocations of the respective table to occasions such that the symbol allocations of different occasions do not overlap.

The means for monitoring 40 monitors if a respective transmission is successfully received (S40). In detail, the means for monitoring 40 monitors for each of a first resource and a second resource different from the first resource and for each of the first type occasions, and for each of the second type occasions if a respective transmission is successfully received. If there is only the first resource, the steps related to the second resource are omitted.

The means for acknowledging 50 acknowledges, in a codebook, the respective transmission if the respective transmission is successfully received (S50). The codebook comprises an ordered sequence of acknowledgment bits for each of the first resource and the second resource, and for each of the first type occasions and for each of the second type occasions. There is a predefined number of acknowledgment bits per resource and per first type occasion and per second type occasion. The predefined number may be a natural number equal to or larger than 1. If there is only the first resource, the steps related to the second resource are omitted.

Figure 4:
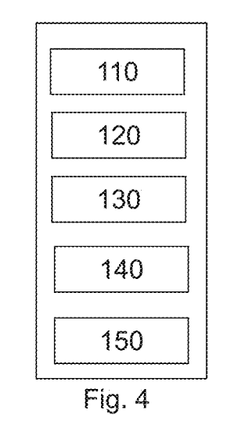
FIG. 4 shows an apparatus according to an embodiment of the invention.
Figure 5:
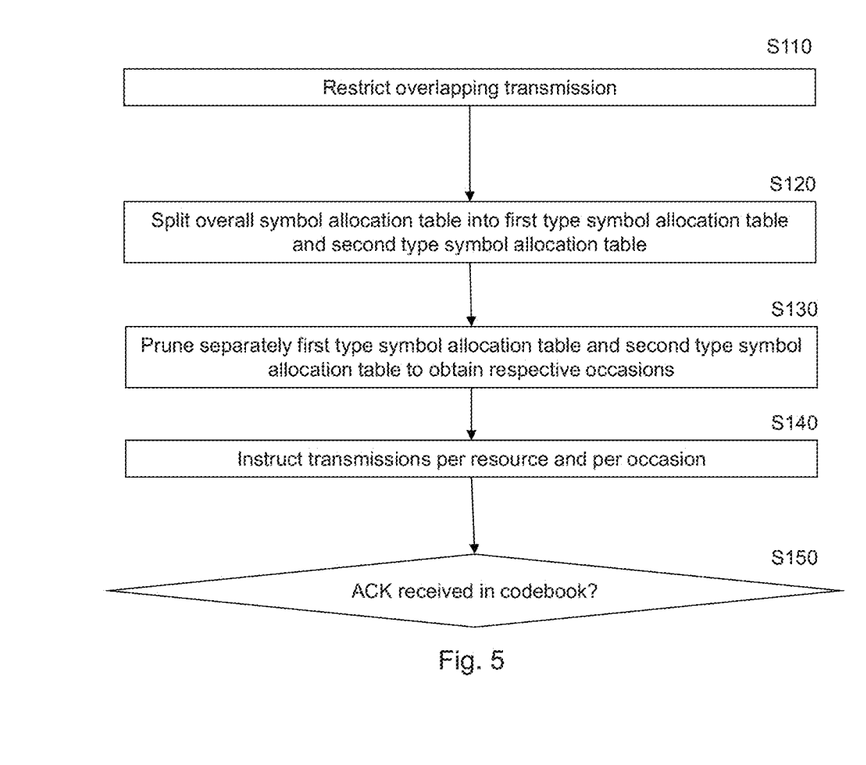
FIG. 5 shows a method according to an embodiment of the invention.

FIG. 4 shows an apparatus according to an embodiment of the invention. The apparatus may be a base station such as a gNB or eNB, or an element thereof. FIG. 5 shows a method according to an embodiment of the invention. The apparatus according to FIG. 4 may perform the method of FIG. 5 but is not limited to this method. The method of FIG. 5 may be performed by the apparatus of FIG. 4 but is not limited to being performed by this apparatus.

The apparatus comprises means for deciding 110, means for splitting 120, means for pruning 130, means for instructing 140, and means for observing 150. The means for deciding 110, means for splitting 120, means for pruning 130, means for instructing 140, and means for observing 150 may be a deciding means, splitting means, pruning means, instructing means, and observing means, respectively. The means for deciding 110, means for splitting 120, means for pruning 130, means for instructing 140, and means for observing 150 may be a decider, splitter, pruner, instructor, and observer, respectively. The means for deciding 110, means for splitting 120, means for pruning 130, means for instructing 140, and means for observing 150 may be a deciding processor, splitting processor, pruning processor, instructing processor, and observing processor, respectively.

The means for deciding 110 decides that an overlapping transmission to a terminal is restricted to an overlapping transmission of a transmission of a first type and a transmission of a second type (S110). That is, overlapping transmissions of two transmissions the first type or overlapping transmissions of two transmissions of the second type are forbidden on the same resource. A value of a configuration parameter of the transmission of the first type is different from a value of the configuration parameter of the transmission of the second type. For example, the configuration parameter may be a DMRS type. If the overlapping transmission is restricted by default (e.g. by a 3GPP standard), the deciding means 110 and the corresponding deciding S110 may be omitted.

The means for splitting 120 splits an overall symbol allocation table into a first type symbol allocation table and into a second type symbol allocation table (S120). The overall symbol allocation table comprises symbol allocations. The first type symbol allocation table comprises one or more (e.g. all) of the symbol allocations related to the transmission of the first type. The second type symbol allocation table comprises one or more (e.g. all) of the symbol allocations related to the transmission of the second type.

The means for pruning 130 prunes the first type symbol allocation table in order to obtain one or more first type occasions for the transmission of the first type and to prune the second type symbol allocation table in order to obtain one or more second type occasions for the transmission of the second type (S130). The means for pruning 30 prunes the first type symbol allocation table separately from the second type symbol allocation table. "Pruning" means assigning the symbol allocations of the respective table to occasions such that the symbol allocations of different occasions do not overlap.

The means for instructing 140 instructs a first transmitter to schedule, on a first resource, a respective transmission of the first type on one or more of the first type occasions and a respective transmission of the second type on one or more of the second type occasions (S140). In addition, the means for instructing 140 instructs a second transmitter to schedule, on a second resource, a respective transmission of the first type on one or more of the first type occasions and a respective transmission of the second type on one or more of the second type occasions (S140). The second resource is different from the first resource.

The means for observing 150 observes if a respective codebook is received (S150). The codebook comprises an ordered sequence of acknowledgment bits for each of the first resource and the second resource, and for each of the first type occasions and for each of the second type occasions. Each of the acknowledgment bits indicates whether or not the respective transmission is successfully received. There is a predefined number of acknowledgment bits per resource and per first type occasion and per second type occasion. The predefined number may be a natural number equal to or larger than 1.

Based on the value of the acknowledgment bit, conventional HARQ operation is performed for the respective transmission. I.e., if the acknowledgment bit indicates that the respective transmission is not successfully received, it is re-transmitted.

Figure 6:
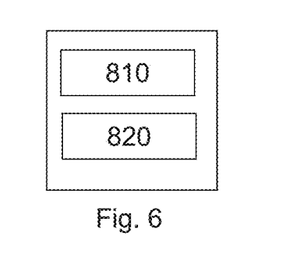
FIG. 6 shows an apparatus according to an embodiment of the invention.

FIG. 6 shows an apparatus according to an embodiment of the invention. The apparatus comprises at least one processor 810, at least one memory 820 including computer program code, and the at least one processor 810, with the at least one memory 820 and the computer program code, being arranged to cause the apparatus to at least perform the method according to one of FIGS. 3, 5, 8, and 10.

Figure 7:
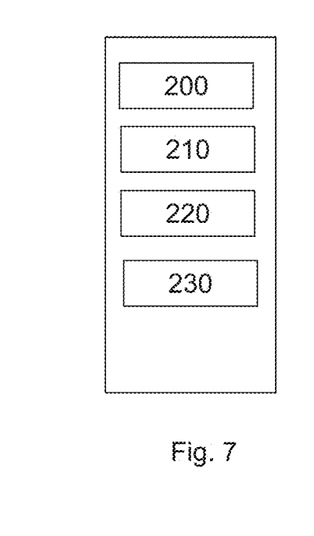
FIG. 7 shows an apparatus according to an embodiment of the invention.
Figure 8:
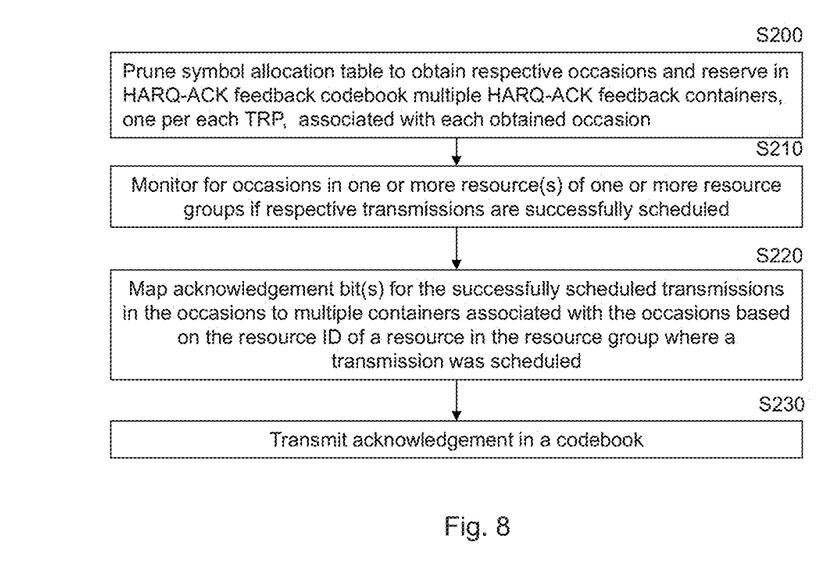
FIG. 8 shows a method according to an embodiment of the invention.

FIG. 7 shows an apparatus according to an embodiment of the invention. The apparatus may be a terminal such as a UE or an IoT device, or an element thereof. FIG. 8 shows a method according to an embodiment of the invention. The apparatus according to FIG. 7 may perform the method of FIG. 8 but is not limited to this method. The method of FIG. 8 may be performed by the apparatus of FIG. 7 but is not limited to being performed by this apparatus.

The apparatus comprises means for pruning 200, means for monitoring 210, and means for mapping 220 and transmitting acknowledgement 230. The means for pruning 200, means for monitoring 210, means for mapping 220 and means for transmitting 230 may be a pruning means, monitoring means, mapping and transmitting means, respectively. The means for pruning 200, means for monitoring 210, and means for acknowledging 220 may be a pruner, monitor, mapper and transmitter, respectively. The means for pruning 200, means for monitoring 210, means for mapping 220 and means for transmitting 230 may be a pruning processor, monitoring processor, mapping processor and transmitting processor, respectively.

The means for pruning 200 prunes the symbol allocation table in order to obtain one or more occasions for the transmission (S200). "Pruning" means assigning the symbol allocations of the respective table to occasions such that the symbol allocations of different occasions do not overlap.

The means for monitoring 210 monitors if a respective transmission is successfully received (S210). In detail, the means for monitoring 210 monitors for each of a predefined number of resources separated into multiple resource groups and for each of the occasions if a respective transmission is successfully received, wherein each of the resources is a respective control resource set.

The means for mapping 220 maps acknowledgement bits into a codebook (S220). The codebook comprises an ordered sequence of acknowledgment bits for each of the predefined group of resources, and for each of the occasions. There is a predefined number of acknowledgment bits per resource and per occasion. The predefined number may be a natural number equal to or larger than 1. In detail, the ordered sequence of acknowledgement bits may be ordered according to the one of the index associated to the resource in the group of resources where the transmission was scheduled. The group of resources may be a set of resources associated with single TRP by for example QCL. The one of the index may be one of the smallest index of the resource in the group of resources, and the largest index of the resource in the group of resources, depending on implementation.

The means for transmitting 230 transmits the acknowledgment bits to gNB, in the codebook (S230).

Figure 9:
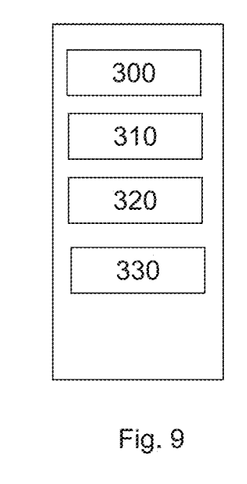
FIG. 9 shows an apparatus according to an embodiment of the invention.
Figure 10:
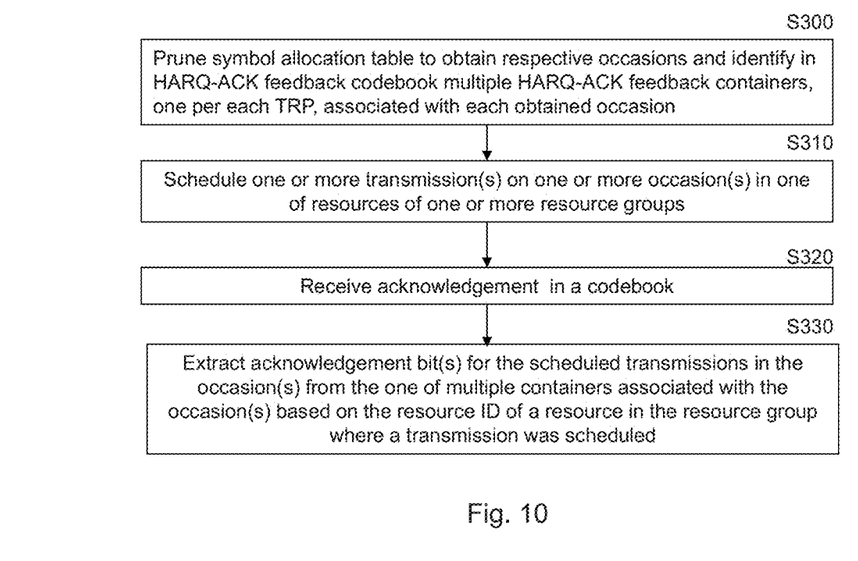
FIG. 10 shows a method according to an embodiment of the invention.

FIG. 9 shows an apparatus according to an embodiment of the invention. The apparatus may be a terminal such as a base station such as a gNB or eNB, or an element thereof, or an element thereof. FIG. 10 shows a method according to an embodiment of the invention. The apparatus according to FIG. 9 may perform the method of FIG. 10 but is not limited to this method. The method of FIG. 10 may be performed by the apparatus of FIG. 9 but is not limited to being performed by this apparatus.

The apparatus comprises means for pruning 300, means for transmitting 310, and means for receiving 320 and means for extracting 330. The means for pruning 300, means for transmitting 310, means for receiving 320 and means for extracting 330 may be a pruning means, scheduling means, receiving means, and extracting means, respectively. The means for pruning 300, means for scheduling 310, means for receiving 320, and means for extracting 330 may be a pruner, transmitter, receiver and extractor, respectively. The means for pruning 300, means for scheduling 310, means for receiving 320, and means for extracting 330 may be a pruning processor, scheduling processor, receiving processor, and extracting processor, respectively.

The means for pruning 300 prunes the symbol allocation table in order to obtain one or more occasions for the transmission (S300). "Pruning" means assigning the symbol allocations of the respective table to occasions such that the symbol allocations of different occasions do not overlap.

The means for scheduling 310 schedules a transmission on one or more occasions (S310). In addition, it may transmit the transmission. In detail, the means for scheduling 310 schedules on a predefined number of resources separated into multiple resource groups, wherein each of the resources is a respective control resource set The means for receiving 320 receives acknowledgments from a UE, in a codebook (S320).

The means for extracting 330 extracts the acknowledgement bits from the codebook (S330). The codebook comprises an ordered sequence of acknowledgment bits for each of the predefined group of resources, and for each of the occasions. There is a predefined number of acknowledgment bits per resource and per occasion. The predefined number may be a natural number equal to or larger than 1. In detail, the ordered sequence of acknowledgement bits may be ordered according to the one of the index associated to the resource in the group of resources where the transmission was scheduled. The group of resources may be a set of one or more resources associated with single TRP by, for example, QCL. The one of the index may be the smallest index of the resource in the group of resources, or the largest index of the resource in the group of resources, depending on implementation.

Embodiments of the invention are explained for a case of two DMRS types (slot based and mini-slot based). However, according to some embodiments of the invention, more than two types may be distinguished.

Embodiments of the invention are described where transmissions and occasions are distinguished according to the DMRS types. However, other parameters (such as the value of K0) available in the PDSCH symbol allocation table or a combination of such parameters may be used to distinguish types of transmissions and types of occasions.

Table 5 and related text provides an example how the HARQ-ACK bits may be ordered in the HARQ-ACK codebook. However, the invention is not restricted to this particular order. For example, depending on the implementation, the bits may be ordered such that the CB comprises first the bits of one TRP (ordered according to DMRS type and then according to the occasion index, or ordered according to the occasion index and then according to DMRS type), and then the bits of the other TRP (ordered according to the same sequence or according to a different sequence than that for the first TRP). Also, the bits may be ordered according to the CORESET index associated to the TRPs. Additionally, when multiple CORESETs are associated to an TRP, the bits may be ordered according to the smallest CORESET index associated to the TRP.

As explained above, the overall symbol allocation table (Table 1) may be split into the slot based symbol allocation table (Table 2) and the mini-slot based allocation table (Table 3). In the above example, the slot based symbol allocation table and the mini-slot based allocation table comprise all the allocations of the overall symbol allocation table. However, in some embodiments, only a subset of the respective symbol allocations may be included in one or both of the slot based symbol allocation table and the mini-slot based allocation table. The other symbol allocations may be excluded from transmission.

According to some embodiments of the invention, instead of "SLIV pruning" according to 3GPP TS 38.213, Section 9, another SLIV pruning algorithm may be applied for other implementations.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

According to the above description, it should thus be apparent that example embodiments of the present invention provide, for example, a terminal such as a UE or an IoT device, or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example, a base station such as a gNB or an eNB, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. Apparatus, comprising:
at least one processor; and
at least one memory comprising computer program code,
the at least one memory and computer program code configured, with the at least one processor, to cause the apparatus at least to
check whether an overlapping transmission is restricted to an overlapping transmission of a transmission of a first type and a transmission of a second type, wherein a value of a configuration parameter of the transmission of the first type is different from a value of the configuration parameter of the transmission of the second type;
split in response to the overlapping transmission being restricted, an overall symbol allocation table comprising symbol allocations into a first type symbol allocation table comprising one or more of the symbol allocations related to the transmission of the first type and into a second type symbol allocation table comprising one or more of the symbol allocations related to the transmission of the second type;
prune the first type symbol allocation table in order to obtain one or more first type occasions for the transmission of the first type and prune the second type symbol allocation table in order to obtain one or more second type occasions for the transmission of the second type, wherein the first type symbol allocation table is pruned separately from the second type symbol allocation table;
monitor, for each of a first resource and a second resource different from the first resource and for each of the one or more first type occasions, and for each of the one or more second type occasions whether a respective transmission is successfully received;
acknowledge, in a codebook comprising an ordered sequence of acknowledgment bits for each of the first resource and the second resource and for each of the one or more first type occasions and for each of the one or more second type occasions, the respective transmission in response to the respective transmission being successfully received.

2. The apparatus according to claim 1, wherein the at least one memory and computer program code are configured, with the at least one processor, to cause the apparatus at least to:
supervise whether an information on a capability to receive the overlapping transmission being provided, wherein
decide that the overlapping transmission is restricted in response to the information on the capability being provided.

3. The apparatus according to claim 1, wherein the at least one memory and computer program code are configured, with the at least one processor, to cause the apparatus at least to:
analyze whether a location of a first reference signal for at least one of the symbol allocations is different from a location of a second reference signal for another of the symbol allocations, wherein the overall symbol allocation table comprises, for each of the symbol allocations, a respective indication of a location of a respective reference signal for demodulating a slot comprising the respective symbols, and the indication of the location is related to the slot; and decide that the overlapping transmission is restricted in response to the location of the first reference signal being different from the location of the second reference signal.

4. The apparatus according to claim 1, wherein the at least one memory and computer program code are configured, with the at least one processor, to cause the apparatus at least to:
listening in response to a higher layer command restricting the overlapping transmission being received; wherein
deciding that the overlapping transmission is restricted in response to the higher layer command being received.

5. The apparatus according to claim 1, wherein the configuration parameter is a type of a demodulation reference signal.

6. The apparatus according to claim 1, wherein the acknowledgment bits in the codebook are ordered according to the respective resource, the respective type of occasion, and an index of the respective occasion for each of the types of occasion.

7. The apparatus according to claim 1, wherein each of the resources are respective one or more control resource sets associated to a respective transmission point from which the respective transmission is received.

8. The apparatus according to claim 7, wherein, wherein the at least one memory and computer program code are configured, with the at least one processor, to cause the apparatus at least to:
order, in response to the resource associated to one of the transmission points being more than one control resource set each having a respective index, the acknowledgment bits according to either the largest index or the smallest index of the indices of the more than one control resource sets.

9. The apparatus according to claim 1, wherein the codebook includes a predefined number of one or more acknowledgement bits per each of the first and second resources and per each of the one or more first type occasions and one or more second type occasions.

10. Apparatus, comprising:
at least one processor; and
at least one memory comprising computer program code, the at least one memory and computer program code configured, with the at least one processor, to cause the apparatus at least to
deciding that an overlapping transmission to a terminal is restricted to an overlapping transmission of a transmission of a first type and a transmission of a second type, wherein a value of a configuration parameter of the transmission of the first type is different from a value of the configuration parameter of the transmission of the second type;
splitting, in response to the overlapping transmission is-being restricted, an overall symbol allocation table comprising symbol allocations into a first type allocation table comprising one or more of the symbol allocations related to the transmission of the first type and into a second type symbol allocation table comprising one or more of the symbol allocations related to the transmission of the second type;
pruning the first type symbol allocation table in order to obtain one or more first type occasions for the transmission of the first type and to prune the second type symbol allocation table in order to obtain one or more second type occasions for the transmission of the second type, wherein the first type symbol allocation table is pruned separately from the second type symbol allocation table;
instructing a first transmitter to schedule, on a first resource, a respective transmission of the first type on one or more of the one or more first type occasions and a respective transmission of the second type on one or more of the one or more second type occasions, and
instructing a second transmitter to schedule, on a second resource different from the first resource, a respective transmission of the first type on one or more of the one or more first type occasions and a respective transmission of the second type on one or more of the one or more second type occasions;
observing whether a respective codebook is received, wherein the codebook comprises an ordered sequence of acknowledgment bits for each of the first resource and the second resource and for each of the one or more first type occasions and for each of the one or more second type occasions, and each of the acknowledgment bits indicates whether or not the respective transmission is successfully received.

11. The apparatus according to claim 10, further comprising:
monitoring whether an indication of a capability of the terminal to receive the overlapping transmission is received, wherein
deciding that the overlapping transmission is restricted in response to the indication of the capability of the terminal being received.

12. The apparatus according to claim 10, further comprising:
analyzing whether a location of a first reference signal for at least one of the symbol allocations is different from a location of a second reference signal for another of the symbol allocations, wherein the overall symbol allocation table comprises, for each of the symbol allocations, a respective indication of a location of a respective reference signal for demodulating a slot comprising the respective symbols, and the indication of the location is related to the slot;
deciding that the overlapping transmission is restricted in response to the location of the first reference signal being different from the location of the second reference signal.

13. The apparatus according to claim 10, further comprising:
commanding by issuing a higher layer command that the overlapping transmission is restricted; wherein
deciding that the overlapping transmission is restricted in response to the higher layer command being issued.

14. The apparatus according to claim 10, wherein the configuration parameter is a type of a demodulation reference signal.

15. The apparatus according to claim 10, wherein the acknowledgment bits in the codebook are ordered according to the respective resource, the respective type of occasion, and an index of the respective occasion for each of the types of occasion.

16. The apparatus according to claim 10, wherein each of the resources are respective one or more control resource sets associated to a respective transmission point, and each of the transmitters is one of the transmission points.

17. The apparatus according to claim 16, wherein the at least one memory and computer program code are configured, with the at least one processor, to cause the apparatus at least to:

order, in response to the resource associated to one of the transmission points is more than one control resource set each having a respective index, the acknowledgment bits according to either the largest index or the smallest index of the indices of the more than one control resource sets.

18. The apparatus according to claim 10, wherein the codebook includes a predefined number of one or more acknowledgement bits per each of the first and second resources and per each of the one or more first type occasions and one or more second type occasions.

19. The apparatus according to claim 10, wherein the at least one memory and computer program code are configured, with the at least one processor, to cause the apparatus at least to:
retransmit one of the transmissions in response to the respective acknowledgment bit indicating that the respective transmission is not successfully received.

20. A method, comprising:
checking whether an overlapping transmission is restricted to an overlapping transmission of a transmission of a first type and a transmission of a second type, wherein a value of a configuration parameter of the transmission of the first type is different from a value of the configuration parameter of the transmission of the second type;
splitting, in response to the overlapping transmission being restricted, an overall symbol allocation table comprising symbol allocations into a first type symbol allocation table comprising one or more of the symbol allocations related to the transmission of the first type and into a second type symbol allocation table comprising one or more of the symbol allocations related to the transmission of the second type;
pruning the first type symbol allocation table in order to obtain one or more first type occasions for the transmission of the first type;
pruning the second type symbol allocation table in order to obtain one or more second type occasions for the transmission of the second type, wherein the first type symbol allocation table is pruned separately from the second type symbol allocation table;
monitoring, for each of a first resource and a second resource different from the first resource and for each of the one or more first type occasions, and for each of the one or more second type occasions whether a respective transmission is successfully received;
acknowledging in a codebook comprising an ordered sequence of acknowledgment bits for each of the first resource and the second resource and for each of the one or more first type occasions and for each of the one or more second type occasions the respective transmission in response to the respective transmission is being successfully received.

21. A method, comprising:
deciding that an overlapping transmission to a terminal is restricted to an overlapping transmission of a transmission of a first type and a transmission of a second type, wherein a value of a configuration parameter of the transmission of the first type is different from a value of the configuration parameter of the transmission of the second type;
splitting, in response to the overlapping transmission being restricted, an overall symbol allocation table comprising symbol allocations into a first type allocation table comprising one or more of the symbol allocations related to the transmission of the first type and into a second type symbol allocation table comprising one or more of the symbol allocations related to the transmission of the second type;
pruning the first type symbol allocation table in order to obtain one or more first type occasions for the transmission of the first type;
pruning the second type symbol allocation table in order to obtain one or more second type occasions for the transmission of the second type, wherein the first type symbol allocation table is pruned separately from the second type symbol allocation table;
instructing a first transmitter to schedule, on a first resource, a respective transmission of the first type on one or more of the one or more first type occasions and a respective transmission of the second type on one or more of the one or more second type occasions;
instructing a second transmitter to schedule, on a second resource different from the first resource, a respective transmission of the first type on one or more of the one or more first type occasions and a respective transmission of the second type on one or more of the one or more second type occasions;
observing whether a respective codebook is received, wherein the codebook comprises an ordered sequence of acknowledgment bits for each of the first resource and the second resource and for each of the one or more first type occasions and for each of the one or more second type occasions, and each of the acknowledgment bits indicates whether or not the respective transmission is successfully received.

* * * * *